Patented Sept. 24, 1946

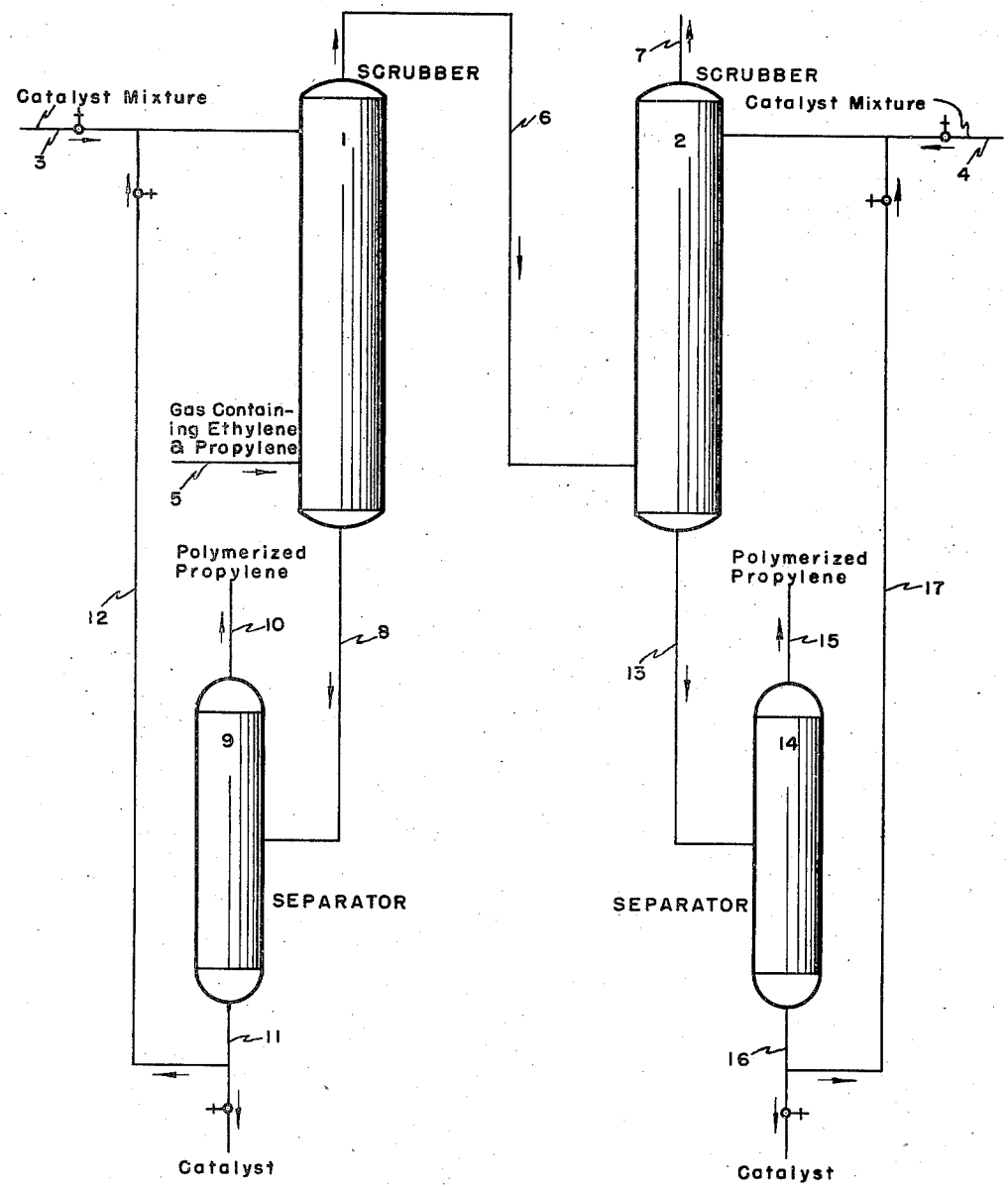

2,408,010

UNITED STATES PATENT OFFICE 2,408,010

PURIFICATION OF ETHYLENE

Edward F. Wadley and Joseph T. Horeczy, Baytown, Tex., assignors to Standard Oil Development Company, a corporation of Delaware Application November 4, 1944, Serial No. 562,021

5 Claims. (Cl. 260—677)

The present invention is directed to a method for separating propylene from ethylene in gas mixtures containing the two, either alone or in conjunction with other hydrocarbon gases.

In certain refinery operations, it is necessary to use, as a feed stock, ethylene which is not contaminated with propylene. An example of such a process is the production of ethyl alcohol from ethylene. The most abundant supply of ethylene, however, is the gas resulting from various refining operations, such as cracking, and here the ethylene is in admixture with propylene as well as $C_1$, $C_2$, and $C_3$ saturated hydrocarbons. Accordingly, it is extremely desirable to provide a method which will make possible the separation of the propylene from the ethylene quantitatively.

According to the present invention, propylene is separated from ethylene by contacting a gas containing the two with a boron fluoride-sulfuric acid mixture whereby the propylene is polymerized selectively. A catalyst mixture suitable for use in the practice of the present invention may contain from 5 to 50 weight per cent of boron fluoride, the remainder being sulfuric acid ranging in strength from about 40 to about 85 per cent. Actually, boron fluoride may be used in any amount necessary to produce a concentrated solution thereof in the acid of the strength selected. The gas to be treated is contacted with this catalyst mixture in the manner customary in the scrubbing of gases with liquids or, for best results, in the manner which is conventional in sulfuric acid polymerization processes to which refinery gases are fed. That is to say, it is contemplated that the gas mixture may be introduced into a body of a counterflowing stream of the catalyst through suitable dispersing nipples, such as porous thimbles, or the like. The object is to achieve complete contact of the gas with the catalyst mixture of boron fluoride and sulfuric acid, and any of the expedients which have been developed for this purpose may be employed.

The scrubbing operation is preferably conducted at pressures between atmospheric and 150 lbs./sq. in. and at temperatures between about 60° and 120° F. The preferred pressure is of the order of 50 lbs./sq. in. or less.

One method for carrying out the present invention is illustrated in the accompanying drawing, in which the single figure is an elevation in diagrammatic form of a suitable apparatus for this purpose.

Referring to the drawing in detail, numerals 1 and 2 designate scrubbing towers. Into the top of each tower there is introduced a stream of the catalyst mixture of $H_2SO_4$ and $BF_3$ through lines 3 and 4, respectively.

The gas to be processed, containing ethylene and propylene, is introduced into the bottom of tower 1 through line 5. It is understood, as has previously been indicated, that any of the various types of distributing devices for effecting improved contact between a gas and a liquid may be employed in conjunction with line 5 in the bottom of tower 1. In its passage through tower 1, the gas will lose the bulk of its content of propylene through polymerization thereof. The residual gas leaves the top of the tower through line 6, which conducts it to the bottom of tower 2 where residual propylene is removed. The propylene-free gas is taken off at the top of tower 2 by line 7. It will be understood that as many of these towers as may be required for complete purification of the gas will be employed. A single tower of suitable height may in some instances be sufficient.

The catalyst carrying polymerized propylene leaves the bottom of tower 1 through line 8 which discharges it into a separator 9 from the upper portion of which polymerized propylene is drawn off through line 10, and from the bottom portion of which the catalyst is drawn off through line 11. Ordinarily this catalyst is recycled back to line 3 by way of line 12 although from time to time portions of it may be removed from the system and replaced by fresh catalyst introduced through line 3.

In like manner, catalyst containing polymerized propylene leaves the bottom of tower 2 through line 13, which discharges into a separator 14 from an upper portion of which polymerized propylene is drawn off through line 15 and from the bottom of which catalyst is drawn off through line 16, which may either remove it from the system or return it to line 4 through line 17.

The nature and objects of the present invention having been fully described and illustrated, what we wish to claim as new and useful and to secure by Letters Patent is:

1. A method for separating propylene from ethylene which comprises scrubbing a gas containing the two with a boron fluoride-sulfuric acid catalyst mixture under conditions suitable for the selective polymerization of the propylene including a temperature between about 60° F. and 125° F. and a pressure not substantially in excess of about 150 lbs./sq. in.

2. A method according to claim 1 in which the catalyst mixture contains about 5 to 50% by weight of boron fluoride the remainder being sulfuric acid ranging in strength from about 40 to 85%.

3. A method according to claim 1 in which the catalyst is a concentrated solution of boron fluoride in sulfuric acid of a strength ranging from about 40 to about 85%.

4. A method according to claim 1 in which the operation is performed under a pressure below about 50 lbs./sq. in.

5. A method according to claim 1 in which the catalyst mixture contains about 5 to 50% by weight of boron fluoride the remainder being sulfuric acid ranging in strength from about 40 to 85% and the operation is performed under a pressure below about 50 lbs./sq. in.

EDWARD F. WADLEY.
JOSEPH T. HORECZY.